United States Patent

[11] 3,588,223

[72] Inventor James H. P. Watson
Corning, N.Y.
[21] Appl. No. 808,912
[22] Filed Mar. 20, 1969
[45] Patented June 28, 1971
[73] Assignee Corning Glass Works
Corning, N.Y.

[54] MAGNETO-OPTICAL PROCESS FOR DETERMINING SUPERCONDUCTIVITY
8 Claims, 2 Drawing Figs.

[52] U.S. Cl. .............................................. 350/151, 340/174.1
[51] Int. Cl. .............................................. G02f 1/18
[50] Field of Search ......................... 324/43, 96; 350/151; 340/174, 174.1

[56] References Cited
UNITED STATES PATENTS
3,079,508  2/1963  Rabinovici ................. 350/151X
3,413,055  11/1968  DeSorbo ..................... 350/151

OTHER REFERENCES

Alers, " Structure of the Intermediate State in Superconducting Lead" Phys. Rev. Vol. 105, No. 1 (Jan. 1, 1957) pp. 104—108

Electronics, " Technique Makes Superconductivity Visible" Vol. 33 (July 22, 1960) pp. 76—78

Primary Examiner—David Schonberg
Assistant Examiner—Paul R. Miller
Attorney—Sughrue, Rothwell, Mion, Zinn & MacPeak ABSTRACT: A process for determining superconductivity in films of varying composition is disclosed. A sheet of cerium phosphate glass is placed over the film, a beam of polarized light is reflected off the film, the film is subjected to a magnetic field for a short period of time as well as incremental reductions in its temperature, and an analyzer is placed in the path of the reflected beam for observing and making a permanent record of the superconducting regions as they occur in the film for each reduction in temperature.

PATENTED JUN 28 1971

INVENTOR
JAMES H.P. WATSON

BY
ATTORNEYS

MAGNETO-OPTICAL PROCESS FOR DETERMINING SUPERCONDUCTIVITY

BACKGROUND OF THE INVENTION

1. Field of the Invention

This invention relates to a process for determining superconductivity, and more particularly an optical technique for rapidly determining the presence of superconducting regions in a film whose composition varies across the surface of the film.

2. Description of the Prior Art

Prior methods of determining superconductivity in metals of varying composition are often time consuming and require the use of costly equipment. One of the most commonly used methods is that of forming an alloy of varying composition; drawing the alloy into the shape of a wire having a specific diameter and length, and then measuring the resistance of the wire to determine the existence of superconducting properties. If the alloy is formed by evaporating the various components of the alloy on a plate, it is necessary to cut the plate into small pieces and test each piece individually for superconducting properties.

SUMMARY OF THE INVENTION

This invention is directed to a rapid method of investigating multialloy systems or films for the presence of superconducting properties.

More specifically, the method employs reflecting a beam of plane polarized light off of the film to be examined. A thin sheet of cerium phosphate glass having a high Faraday rotation is placed in close contact with the surface of the film. As is known, the Faraday effect is the rotation of the plane of polarization of a light beam when it is passed through a magnetized substance in the direction of the applied field. The amount the plane of polarization of the light beam is rotated is dependent upon the magnetization of the cerium phosphate glass. For most paramagnetic substances such as cerium, the magnetization is essentially proportional to the applied field for low fields of less than 1,000 gauss.

To provide this magnetization, a solenoid type coil is used. A switch is also provided for momentarily energizing and then deenergizing the coil. Current is induced in the film by energizing the coil for a short period of time. When energized, the coil creates lines of magnetic flux through the film. When the coil has been deenergized, the magnetic flux begins decreasing and the change in magnetic flux induces currents in the film. If the film possesses no superconducting properties, the decay of the induced current due to the finite resistivity of the film will permit the flux to leave the film. However, if superconducting properties are present in the film, super currents will be induced in the film upon the deenergization of the coil. These super currents trap the magnetic flux in the areas of the film that are superconducting. The trapped flux in the film will then cause Faraday rotations to occur in the cerium phosphate glass adjacent to it.

As the polarized light is reflected back through the cerium phosphate glass, the light reflected from the superconducting areas will be rotated and will thus have a different plane of polarization than the light reflected from the nonsuperconducting areas. The light is reflected toward an optical analyzer. The analyzer is oriented so that light having a plane of polarization unaffected by the cerium phosphate glass will pass therethrough, but light having a plane of polarization which is rotated by the cerium phosphate glass will be reduced in intensity. Thus, the dark spots in the analyzer output represent the areas of superconductivity of the film.

The extent of the superconducting region present in the film depends on the temperature thereof. As the temperature is reduced, the sensitivity of the cerium phosphate glass is considerably increased because its paramagnetic susceptibility is inversely proportional to its temperature. Thus, for example, if the superconducting region of a multialloy film appears as a dot in the analyzer output at the maximum transition temperature occurring in the multialloy system, a subsequent reduction in temperature will increase the size of the dot and will visibly show the extent of the superconducting region at the specific temperature. The analyzer output can then be photographed to provide a permanent record of the extent of superconductivity present in the film at any given temperature. A graph can also be drawn of the boundaries of the superconducting regions at each temperature. As can be seen, this method provides for the rapid analysis of a large number of multialloy compositions in a relatively short period of time.

BRIEF DESCRIPTION OF THE DRAWINGS

FIG. 1 is a diagrammatic representation of a preferred embodiment of the magneto-optic apparatus used to practice the method of the present invention.

DESCRIPTION OF THE PREFERRED EMBODIMENT

Figure 2:
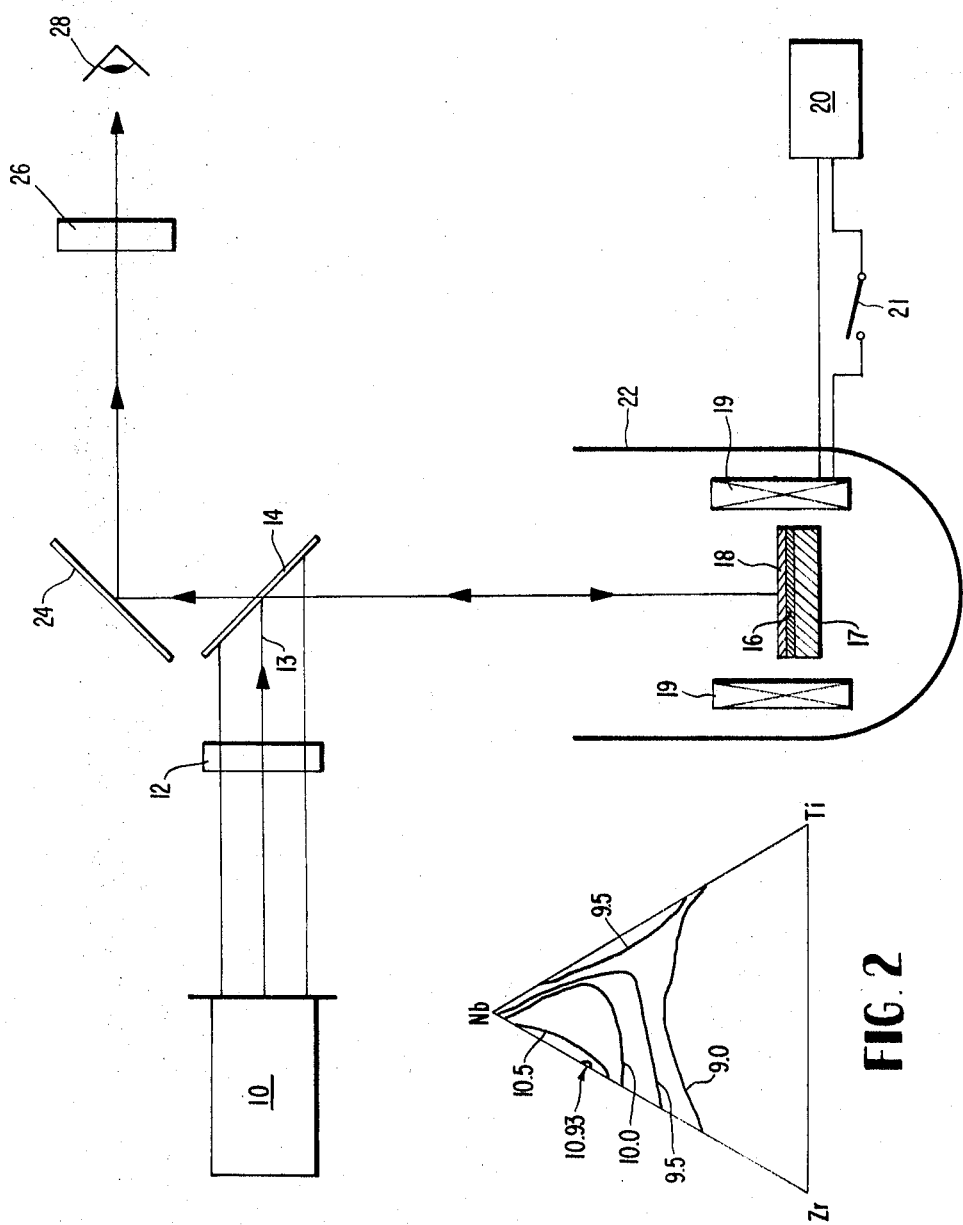
FIG. 2 is an example of a plot of a ternary alloy system which can be obtained by using the method of the present invention.

Referring now specifically to FIG. 1, a collimated light source 10 is directed through a polarizer or plane polarizing filter 12 of any well-known type. The resulting beam 13 is plane polarized by the filter 12. The plane polarized beam 13 is directed to a beam splitter 14 and from there normal to the film 16 which is to be analyzed. The film 16 may be an alloy formed by evaporating several elements such as, for example, niobium, zirconium and titanium in a thin layer on a suitable nonconductive, nonmagnetic substrate 17 such as silica. The result is a plate having a thin film of varying composition across its surface.

The method of this invention can be used for investigating the superconducting properties of any ternary alloy system, some examples of which are Niobium-Vanadium-Carbon, Niobium-Germanium-Aluminum, Niobium-Molybdenum-Aluminum, Vanadium-Silicon-Carbon, and Vanadium-Silicon-Aluminum.

Closely adjacent to thin film 16 is a thin glass plate 18 of a substance such as, for example, cerium phosphate which has a high Faraday rotation characteristic.

Other materials containing magnetic properties similar to cerium phosphate glass are neodymium glass and films containing a mixture of europium sulfide and europium fluoride. Surrounding the film 16, the substrate 17, and the plate 18 is a solenoid type coil 19 capable of creating a magnetic field of approximately 1,000 gauss when energized from a source of direct current 20 via switch 21. A container 22 encloses the coil 20, the plate 18, and the film 16. The area inside the container is capable of being cooled to temperatures of approximately 8° K. by any suitable means not shown.

The beam 13 passes through the glass plate 18 and is reflected off the surface of the film 16 back through the plate 18. A magnetic field is induced in the film when the solenoid 19 is momentarily energized by source 20 and switch 21. When the solenoid is deenergized, eddy currents are induced in the film in the superconducting regions which trap the magnetic flux in the superconducting region. If the film 16 is nonsuperconducting, the induced current will decay and permit the magnetic flux to leave the plate, and the beam 13 of plane polarized light will not suffer any rotation as it passes back through the glass plate 18 and through the beam splitter 14 to mirror 24 and plane polarizing analyzer filter 26. If the axis of polarizer 12 is arranged such that the plane of polarization of the polarized beam 13 is parallel to the axis of the analyzer filter 26, all of the light from the beam 13 will normally pass through the analyzer filter 26 to the viewer 28. However, if the film 16 does possess superconducting characteristics, the current induced by the momentary energization of coil 19 will trap the magnetic flux in areas of superconductivity. The trapped flux acting on the glass plate 18 will case rotation to occur in the glass plate as a result of the Faraday phenomenon. Rotation will occur in the areas of the glass which correspond to the areas of the film containing the trapped flux. The beam 13 will have portions thereof rotated with respect to the reminder of the beam. With the analyzer filter 26 positioned as mentioned above, the rotated portions will not pass through the analyzer filter 26 and will be viewed at the output of the analyzer filter 26 as dark spots or areas against a bright background. The dark spots or areas will indicate the presence and extent of any superconductivity present in the film 16. It should be noted that the areas of superconductivity could appear as a light spot or area on a dark background by simply rotating one of the polarizing elements 12 or 26 by 90°.

FIG. 2 is an example of a plot of a ternary alloy system which can be obtained by using the method of the present invention. A film composed of Niobium (Nb), Zirconium (Zr) and Titanium (Ti) is used as an example. Such a film of varying composition could be obtained by locating evaporation sources containing Niobium, Zirconium, and Titanium at three corners of an equilateral triangle. The conditions and dimensions can be adjusted so that the proportion of each of the above mentioned elements along the lines connecting any two sources would vary from 0 to 100 percent. Specifically, the substrate 17 and the evaporation sources would be placed in an oven and the temperature and pressure controlled such that films would be formed by evaporation which would grow radially outward from each of the corners of the triangle. Deposition of the materials would be greatest at their respective corners and decreasing as the radius from the source increased. The process would be stopped at the point when the film radius just equaled the side of the triangle. The film thus produced would contain all possible alloy compositions of the three elements.

The plot, shown by way of example in FIG. 2, could be obtained as follows. As the temperature of the film 16 is reduced, a black spot initially occurs at the point indicated as 10.93° K. As the temperature is further decreased to 10.5° K., the initial dark spot increases in size and occupies the area enclosed between the 10.5° K. line and the Niobium-Zirconium axis. As the temperature is reduced to 10.0°, the area increases as shown by the boundary line so labeled. At 9.5° K. the initial area increases and a second dark area appears along the Niobium-Titanium axis. Additional contour lines could be obtained if the temperature is decreased to a value below 9.0° K.

At each decrease in temperature, the observed pattern projected through analyzer 26 could be photographed to provide a permanent record. In the alternative, the pattern could simply be plotted or graphed as by tracing the projected image thereof. The graphs or photographs thus obtained provide a complete analysis of the superconductivity of the ternary alloy system under investigation.

I claim:

1. The method of determining the superconductivity of multialloy films having varying compositions between the boundaries thereof at different temperatures, comprising the steps of:
   a. depositing a multialloy film having varying compositions between its boundaries on a substrate;
   b. covering at least one surface of said film with a material having a high Faraday rotation;
   c. inducing a magnetic flux in those regions of said film which are superconducting;
   d. directing a beam of plane polarized light normal to said surface whereby said beam is reflected from said one surface and the plane of polarization of said beam is rotated by said material in the areas adjacent said regions; and
   e. directing said reflected beam towards an analyzer which is positioned with respect to said beam so as to distinguish between the light subjected to rotation by said material and that light not so subjected to rotation.

2. The method according to claim 1 further comprising the steps of:
   a. varying the temperature of the film; and
   b. observing the superconducting regions of the film as the temperature is varied.

3. The method of claim 2 wherein the temperature is varied in incremental steps.

4. The method of claim 3 further including the step of photographing the image projected by the analyzer for each increment of temperature change.

5. The method of claim 1 wherein the step of inducing a magnetic flux comprises:
   a. energizing a coil in the vicinity of the film to induce a magnetic field in said film; and
   b. deenergizing said coil to induce currents in said film in the superconducting regions thereof whereby the magnetic flux in said superconducting regions is trapped by said currents.

6. The method of claim 1 wherein the depositing of said multialloy film comprises the depositing of a ternary alloy film having varying compositions between its boundaries.

7. The method of determining the superconductivity at different temperatures of a multialloy film having varying compositions between the boundaries thereof comprising the steps of:
   a. depositing each of the alloys of said multialloy film radially from its respective source such that the disposition of each of said alloys decreases as a function of the radial distance from its source and further, that the deposited alloys combine in different proportions so as to form a multialloy film of varying composition;
   b. covering at least one surface of said film with a material having a high Faraday rotation;
   c. inducing a magnetic flux in those regions of said film which are superconducting;
   d. directing a beam of plane polarized light normal to said surface whereby said beam is reflected from said one surface and the plane of polarization of said beam is rotated by said material in the areas adjacent said regions; and
   e. directing said reflected beam towards an analyzer which is positioned with respect to said beam so as to distinguish between the light subjected to rotation by said material and that light not so subjected to rotation.

8. The method of claim 7 wherein said multialloy film is a ternary alloy and wherein, each of said respective sources of said alloys is placed equidistant from each other to form an equilateral triangle, said depositing of said alloys continuing until the radius of the deposited film equals the length of the side of said triangle whereby a multialloy film is formed consisting of all possible combinations of said elements.